Patented Feb. 27, 1945

2,370,562

UNITED STATES PATENT OFFICE 2,370,562

METHOD OF PREPARING A COATED RESIN PRODUCT

Vincent Meunier, Akron, Ohio, assignor to Pittsburgh Plate Glass Company, Allegheny County, Pa., a corporation of Pennsylvania No Drawing. Application May 6, 1941, Serial No. 392,111

15 Claims. (Cl. 18—47.5)

This invention relates to the polymerization of polymerizable organic compounds particularly those which contain at least two polymerizable unsaturated groups which are unconjugated with respect to carbon, and is particularly related to the polymerization of esters, ester amides, and ethers which contain at least two polymerizable unsaturated groups. In the polymerization of such materials it has been found that the production of desirable products is exceedingly difficult for the reason that the final polymerization products are generally badly cracked and often contain many bubbles which are formed during polymerization. Moreover, the surface of such polymers generally contains many defects. The invention is particularly related to the production of coated polymers. In the production of such products by prior art methods, difficulty is often encountered in securing a suitable bond between the coating and the base.

In accordance with the present invention, these difficulties have been avoided and clear, transparent polymers of any desired shape which are free from cracks and bubbles and possess coatings which adhere tenaciously to the base have been produced. The polymerization of the materials herein contemplated appears to proceed through a plurality of stages. When polymerization is first initiated, the monomer thickens to a viscous syrup which is probably a solution of a fusible polymer dissolved or dispersed in the monomer. This fusible polymer is generally soluble in many organic solvents. As polymerization proceeds further, a solid or semi-solid gel is formed. This product probably comprises a mixture of monomer and polymer and possesses many of the following characteristics: At least a portion of this gel is found to be substantially insoluble in the common organic solvents such as xylene or acetone and merely swells when subjected to the action of such solvents. Generally, the polymer in the gel comprises a mixture of soluble and insoluble polymers, and the two may be separated by extraction with solvents. In most cases, the quantity of insoluble material in the gel is large, often being about 20 to 75 per cent by weight of the total mixture. The gel is generally soft, pliable and may be flexed readily.

Ordinarily the gels do not possess substantial rigidity and generally, a flat sheet thereof may be bent or curved to a substantial degree without fracture. For example, ethylene glycol bis (methallyl carbonate) may be polymerized to form a gel ⅛ inch in thickness, 12 inches long and 2 inches wide which may be lapped upon itself to form a cylindrical section. In some cases, however, the gel may possess considerable stiffness and be incapable of being bent in this manner, at ordinary temperatures. This may be particularly true of thick sections thereof. The gels are comparatively weak, do not possess a high tensile strength and tear readily. Often they have a physical structure resembling that of a gelatin gel.

These polymerization products may be further polymerized to form hard, tough polymers which are considerably less brittle than glass and more resistant to shattering. Such polymers, which may be termed "glassy" or "rigid" polymers, have high tensile strength and have many of the properties characteristic of other organic glasses. Generally, these products possess substantial rigidity and bend only under comparatively high loads, although in some cases, pliable polymers may be prepared. The glass polymer generally possesses considerable elasticity. Thus, when it is deformed under a load, it generally tends to assume its original shape when the load is released. These polymers contain a high concentration, generally 90 percent or more, of insoluble material.

In accordance with the present invention, it has been found that desirable products may be obtained by polymerizing the polymer herein contemplated to the gel state and thereafter applying a coating of a polymerizable material to the surface thereof and further polymerizing the gel and the coating. In order to secure an improved surface it is desirable to complete polymerization of the coating while maintaining the coating in contact with a smooth surfaced mold which is capable of imparting a smoothness characteristic of press polished surfaces to the coating.

The polymerization may be conducted by various methods. In a copending application of Irving E. Muskat, Serial No. 398,241, filed June 16, 1941, methods have been described whereby the compounds herein contemplated may be polymerized under conditions such that strains exceeding the rupture point of the polymer are prevented from being established, whereby a major portion or all of the tension established within the polymer during polymerization is released before the polymer fractures and generally before the rigid or glassy polymer is produced. When polymerization is conducted in a mold the polymer adjacent the mold surface is permitted to shrink thereby preventing the establishment of surface strains which might otherwise rupture the polymer. When the monomer or syrupy polymer is polymerized in a mold, it is noted that as polymerization proceeds through the gel state, internal strains within the gel are produced and ultimately these strains become so great that the tension within the polymer exceeds its rupture point, whereby fractures are formed. While the gel has been regarded previously as incapable of contraction, it has now been discovered that if the gel is freed from the mold surface or if the gel is prevented from adhering tenaciously to such surface, the gel is capable of shrinking to an extent such that a major portion of the internal tension is released, whereby unfractured glassy polymers may be secured. Generally, this shrinkage is effected by freeing the surface or surfaces of the polymerized gel from the mold to permit the polymer to shrink and thereafter, the polymerization is continued. If necessary, this process may be repeated, or if desired, the further polymerization may be conducted in a manner such that gradual shrinkage, particularly of the surface portion of the polymer, may occur during the polymerization by methods hereinafter more fully set forth.

The invention is particularly related to the treatment of polyesters of polybasic acids containing at least two unsaturated groups which are unconjugated with each other through carbon. Thus, the invention may be applied to the unsaturated alcohol polyesters of polybasic acids such as the esters of oxalic, maleic, adipic, malonic, succinic, itaconic, citric, tartaric, fumaric, phthalic, sulphuric, carbonic, silicic, phosphoric, or titanic, acids or other acids such as diglycolic or dilactic acid, etc., and the unsaturated alcohols containing up to 10 carbon atoms, such as allyl, vinyl, methallyl, β-ethylallyl, crotyl, isocrotyl, 2-chloroallyl, methyl vinyl carbinyl, isopropenyl, isobutenyl, butadienyl, propargyl, or tiglyl alcohol. Mixed esters such as vinyl-allyl, vinyl-crotyl, vinyl-methallyl, methallyl-allyl ester, etc., or esters of higher molecular weight alcohols such as oleyl or linoleyl alcohol, or the unsaturated alcohols derived by hydrolysis of drying or semidrying oils such as China-wood or linseed oil and subsequent reduction of the acid group may also be subjected to treatment. Likewise, the invention may be applied to treatment of the esters formed by reaction of a polyhydric compound such as ethylene glycol, propylene glycol, or butylene glycol, or the corresponding polyglycols, trimethylene glycol, hexamethylene glycol, glycerol, methyl glycerol, resorcinol, hydroquinone, phthalyl alcohol, polyvinyl alcohol, hydrated cellulose, soda cellulose, etc., with haloformates of the above unsaturated alcohols such as allyl or methallyl chloroformates or acid esters of polybasic acids and unsaturated alcohols such as allyl, methallyl, or crotyl acid oxalate, acid phthalate, acid maleate, acid succinate, acid adipate, or other compound described in copending application for Letters Patent of Franklin Strain and Irving E. Muskat, Serial No. 361,280, filed October 15, 1940, including esters of hydroxy acids esterified with unsaturated alcohols such as vinyl, allyl or methallyl lactate, glycolate, or salicylate, and esters of polybasic acids which are partially esterified with unsaturated alcohol, such as allyl, methallyl, crotyl or other chloroformate, allyl, methallyl, or other acid phthalate, acid maleate, acid succinate, etc., such as are described in applications of Franklin Strain and Irving E. Muskat, Serial No. 365,103, filed November 9, 1940, and Serial No. 403,703, filed July 23, 1941.

Other polymers may be secured by the treatment of unsaturated alcohol esters of unsaturated acids such as crotonic, propiolic, and cinnamic esters of the above unsaturated alcohols. In addition, other compounds containing at least two unsaturated groups, preferably those which are unconjugated with respect to each other through carbon, such as glycol or glycerol polycrotonate, glycerol, di-, or triallyl ether, glycol dimethallyl ether, or ether-esters such as the ester of allyl or methallyl cellosolve and the above polybasic acids such as carbonic, carbamic, sulphuric, phthalic, or oxalic acids, etc. Moreover, the ester amides corresponding to the above-mentioned esters such as the allyl or methallyl esters of phthalamide or adipamide, etc., may be treated as herein described as well as substituted ureas such as diallyl urea, dicrotyl urea, etc. Other compounds containing two or more unconjugated groups such as allyl styrene, crotyl styrene, diallyl benzene, etc., may be treated.

In order to obtain products of maximum hardness, it is desirable to utilize compounds wherein the number of carbon atoms in the monomeric molecule is not excessive. Thus, allyl esters polymerize to form substantially harder products than the polymer produced by direct polymerization of the corresponding oleyl esters. Other things being equal, the trend toward softer products increases as the number of carbon atoms per unsaturated group increases. The trend toward softer products with increase in carbon atoms may be minimized by increasing the number of polymerizable groups in the composition. In general, it is preferred to make use of agents wherein the ratio of the number of carbon atoms to the number of polymerizable unsaturated groups does not exceed 15.

The polymerization of the products under conditions such as to permit release of tension within the polymer during polymerization may be conducted by various methods. Generally, the polymerization is conducted by means of heat and/or light such as ultra-violet light and in the presence of oxygen catalyst such as oxygen, ozone, peroxides, such as lauryl, benzoyl or tetralin peroxide, etc. In accordance with one suitable modification, the compound to be polymerized is placed in a mold either as a monomer or as a syrupy partially polymerized product and is further polymerized until the product solidifies to a gel. Approximately as soon as a gel which is sufficiently coherent to permit removal of the gel from the mold is formed, the gel is freed from the surfaces of the mold and the gel, particularly the surface portion thereof, permitted to shrink, whereby internal strains are released. This process is particularly effective in the polymerization of sheets of substantial size where a large shrinkage longitudinally and laterally of the sheet occurs upon freeing the sheet from the mold. Because of the low resistance of the gel to tearing, care is required in removing the gel from the mold surface in order to prevent the gel from tearing. The pliable gel may be shaped to convenient form and further cured to complete the polymerization. Generally, this is done by placing the pliable gel into a mold of suitable shape for further curing.

The time at which the gel should be released from the mold surface is determined by the nature of the gel and varies widely with different materials, different catalyst concentration, presence of inhibitor, etc. Accordingly, no hard and fast rule may be laid down. If it is attempted to release the gel before it has developed sufficient strength, it may tear during the releasing operation. On the other hand, if the releasing is delayed too long, fracturing occurs. In general, the time when the gel should be released should be ascertained by preliminary tests. Roughly, the time may be determined by determination of the percent of insoluble matter present in the gel. This may be done by disintegrating a weighed portion of the gel, extracting the gel overnight with a solvent for monomer and soluble polymer such as acetone, chloroform, carbon tetrachloride, xylene, etc., and determining the weight of undissolved matter. For most purposes, the percent insoluble in the gel should exceed 20 percent by weight of the gel but generally, should not be in excess of about 75 percent by weight.

In accordance with a further modification, the gels produced herein may be prepared in molds, the surfaces of which are sufficiently lubricated to permit shrinkage during polymerization. For example, molds having amalgamated surfaces such as amalgamated tin or the molds may be coated with lubricants in order to permit the polymer to shrink during curing and thereby to eliminate the step of releasing the surface from the mold. Moreover, the monomer or syrupy or fusible polymer may be floated upon an aqueous salt solution or upon mercury or other dense immiscible inert liquid and polymerized to a gel or to a finally polymerized state.

In a further modification, the monomer may be polymerized in a mold capable of contraction such as a mold of rubber, monomer polymerized to the gel state, artificial rubber, etc. In addition, the polymerization may be conducted in a manner such that the product is formed into a plastic mass which is extruded or otherwise made into a continuous sheet and polymerized to a strong gel without adhesion to a mold. This sheet may then be drawn by rolls, belts, or other conveying means through a polymerizing chamber and may be finally delivered to a point where it may be severed into sections and subjected to further operations such as coating, shaping, press polishing, etc. In order to render the monomer and/or syrupy polymer sufficiently plastic to permit such a process, solid polymers such as methyl methacrylate polymer, vinyl acetate polymer, etc. or solid monomer such as the product derived by treatment of allyl or other unsaturated chloroformate with ethylene diamine may be introduced.

The invention is particularly applicable to the production of polymer sheets of substantial size. Sheets of various thicknesses from one-eighth of an inch or less and upward may be prepared in this manner. In such a case the compound may be polymerized to the gel in a suitable horizontal mold provided with side walls. If desired, the polymerization may be conducted without contacting the upper surface of the polymerizing liquid with a mold surface. In such a case, if the polymerization is conducted in air, polymerization adjacent the upper surface of the polymerizing composition may be materially minimized and may remain tacky even when the opposed surface is non-tacky. This may be avoided, if desired, by conducting polymerization in an inert atmosphere such as an atmosphere of carbon dioxide. In many cases, however, it is desirable to minimize polymerization adjacent the upper surface of the polymer and in such cases, polymerization is conducted with the exposed surface in contact with air. In accordance with a further modification, a plate may be suspended upon the compound undergoing polymerization whereby polymerization occurs between the plates. If desired, thick blocks may be cast in the manner herein described and the block of gel thus obtained may be sliced into thin sheets and further cured.

The conditions required for polymerization to form the gel vary in accordance with the activity of the compound being polymerized, catalyst concentration, and temperature. Generally, the temperature of polymerization should be maintained sufficiently low to insure the presence of enough catalyst in the gel to permit its further polymerization to the infusible state. This is generally essential in dealing with allyl, methallyl, and similar esters of polybasic acids, including the complex mixed esters such as ethylene glycol di(allyl carbonate).

In accordance with the present invention, it has been found desirable to coat these polymers while in the gel state with a polymerizable material and to further cure the coated polymer, preferably in contact with a smooth surfaced mold capable of imparting a press polished surface to the polymer such as a glass or highly polished metal plate. The polymerizable material used for coating the surface of the gel may be of the same or a different material from that which the gel was produced and may be in the form of monomer or syrupy polymer or fusible polymer. Thus, the gel may comprise a polymer of a material capable of forming a tough, flexible polymer, such as diethylene glycol bis (methallyl carbonate) while the surfacing polymer may comprise a compound which polymerized to form a harder, more abrasion-resistant polymer, such as allyl or methallyl acrylate, methacrylate or chloroacrylate, glycol dimethacrylate, glycerol trimethacrylate or the corresponding acrylate or chloracrylate, diallyl or dimethallyl phthalate, maleate, fumarate, vinyl ethyl maleate, or ethylene glycol bis(allyl carbonate), etc. Other products having a hard, tough surface may be obtained by using a compound for the coating which is more actively polymerizable than the compound from the base. Thus, polymers of methallyl esters may be coated with the corresponding allyl esters and polymers of allyl esters may be coated with the corresponding vinyl esters. By this process it is possible to obtain a tough resilient polymer surfaced with a harder material which is more resistant to penetration. By application of the coating to the polymer while the polymer is in the gel state, it is found that in many cases the adhesion is superior to that obtained when the coating is applied to the completely polymerized material. Since application of a polymerizable coating under the method described herein permits production of a superior surface it is advantageous to apply a polymerizable coating even though superior surface hardness is not required. Thus, it may be desirable to coat the gel with the same monomer from which the gel has been obtained or a fluid polymer or a solution of a fusible polymer thereof.

The coated gel may be subjected to shaping or forming treatment, if desired, and may be treated to complete the polymerization by subjection of the polymer to heat and/or light. As previously noted, it is found desirable to apply a smooth surfaced mold such as glass or highly polished metal plate to the coated surface. Only light pressure is generally applied since otherwise, the coating may be squeezed from under the plates or the gel may be fractured.

During further polymerization it is often desirable to release the polymer from the mold one or more times to prevent fracturing. This may be done after the coating has set into a gel and has become only slightly tacky. Preferably, the mold is separated while the polymer is hot and before cooling to room temperature can occur. Thereafter, the coated gel may be further polymerized, preferably in contact with press polishing plates. The polymer is preferably cooled to about room temperature after releasing from the mold and before the press polishing plates are replaced since otherwise, defects may develop in the coated surface.

In many cases it is found to be difficult to secure a suitable coating by application of monomer alone to the gel surface since the monomer may tend to be squeezed out upon application of the surfacing plates. Accordingly, it is found desirable to apply a partially polymerized product having substantial viscosity such as a syrup obtained by polymerization of an organic oxygen compound containing at least two unsaturated polymerizable groups and interrupting polymerization before the gel is formed and while the mixture remains in liquid state. This syrup may then be applied and is found to possess sufficient resistance to flow to permit application of suitable films.

In accordance with a further modification, the coating may be polymerized until a solid or semi-solid polymer is formed prior to the application of the smooth surfaced mold. Thereafter, the plates may be applied and the product polymerized until the coating is nontacky. This method avoids exudation of monomer in cases where this difficulty might otherwise be encountered.

During the time at which the gel is removed from the mold and coated, it is generally desirable to interrupt polymerization. With many of these materials this may be done by cooling the gel to room temperature. On the other hand, more active materials may require chilling to low temperatures. In dealing with very active substances, such as allyl or methallyl methacrylate, or glycol dimethacrylate, the production of the gel requires special precautions and generally, it is desirable to polymerize such materials in the presence of an inhibitor such as hydroquinone or a diluent such as a slowly polymerizable material, for example, crotyl crotonate, dicrotyl phthalate, etc., in order to decrease the rate of polymerization to an extent such that a gel may be obtained.

The temperature required for polymerization of the compounds herein contemplated in order to produce the gel and also, to further cure the gel is dependent upon the nature of the compound being polymerized and especially upon the catalyst used. In general, it may be stated that the temperature should not exceed the temperature at which the peroxide catalyst decomposes spontaneously and should be maintained sufficiently below this temperature to insure the presence of catalyst in the gel until polymerization has proceeded to a desired degree. Using benzoyl peroxide as a catalyst, polymerization to the gel state at a temperature of 50 to 90° C. is found to be preferable. The gel is, in general, further cured at 70 to 90° C. and finally cured at a somewhat higher temperature, for example, 100 to 125° C. Finally the residual catalyst may be completely destroyed by raising the temperature to a sufficiently high level, for example, 150° C. With catalysts such as acetone peroxide, the permissible temperature limitations, particularly in the final stages of cure may be considerably higher. On the other hand, certain catalysts decompose too rapidly at the specified temperatures and accordingly, lower temperatures are required.

The following examples are illustrative:

Example I

Diallyl phthalate containing 5 percent by weight of benzoyl peroxide was heated at a temperature of 70 to 80° C. until the liquid thickened and the viscosity had increased approximately by 500 percent. 500 grams of this thickened monomer was poured into a glass tray 14 inches long. The tray was heated in an oven at 75° C. for 3 hours. The tray was then taken from the oven and the sides removed. The gel resting on the bottom plate was allowed to cool to 50–60° C. A strip of gel, 0.5" wide, was cut from the sides, employing a razor blade and straight edge. The gel was then lifted from the plate and allowed to cool to room temperature. Upon removal from the plate it shrank approximately ¼" in length and width. The gel was very flexible and slightly elastic. It possessed a slight blue fluorescence. The surface exposed to the atmosphere during the heating period was tacky.

A portion of the gel trimmed from the sides contained 3.2% of benzoyl peroxide and 44% of acetone-insoluble materials.

100 g. of thickened monomer was poured upon a tempered glass plate 18 inches square. The monomer was concentrated in a pool along one side of the plate. The gel was placed, tacky side downward, over the pool of monomer and rolled onto the plate from one edge thereof to the other by means of a cylindrical tube in such a way as to force the pool of monomer across the plate to the opposite side, whereby air was squeezed from between the plate and the polymer and the glass and polymer surfaces were completely coated.

A second pool of thickened monomer, 100 g., was poured along a side of the exposed surface of the gel. A second tempered glass plate was lowered over the pool of monomer in a manner resembling the closing of a book, whereby the monomer was forced to flow to the opposite side to coat the plate and the gel surface and to avoid air entrapment. Excess monomer was drained from the plates and swabbed from the sides of the gel.

The resulting sandwich was heated in an oven at 75° C. for 2 hours. Thereafter, the temperature of the oven was raised to 100° C. and heating continued for one-half hour. The plates were then pried apart and the sheet removed from the oven. The sample was pulled from the bottom plate, to which it adhered tenaciously, and allowed to cool. At this stage the sample was colored slightly yellow when viewed edgewise and possessed a blue fluorescence. The sample was heated for 2 hours between tempered glass plates at a temperature of 100° C. and then allowed to cool between the plates. A sheet of transparent polymer $\tfrac{7}{16}$ inches in thickness was thus obtained.

Example II

A quantity of partially polymerized ethylene glycol bis (methallyl carbonate) was prepared by heating monomeric ester containing 5 percent by weight of benzoyl peroxide until the viscosity increased 500 percent. The thickened monomer was then poured into a 14" x 14" tray as in Example I and heated at 80° C. for 90 minutes.

The gel was colorless, flexible and tacky on the surface exposed during the heating period. By analysis of samples thereof, peroxide content was found to be 2.8 percent by weight and the acetone-insoluble content was 52 percent by weight.

The gel was removed from the tray to permit shrinkage and was coated with further thickened monomeric ethylene glycol bis (methallyl carbonate) and placed between tempered glass plates using thickened monomer on both sides of the gel as described in Example I. The resulting sandwich was placed in an oven and heated at 80° C. for one hour and thereafter, the product was heated at 100° C. for one hour. At this time the plates were removed from the sheet as in Example I and the product was heated at 100° C. for 2 hours. A clear, hard, and apparently haze-free sheet $\frac{1}{8}$ inches in thickness was obtained.

*Example III*

The process of Example I was repeated using diethylene glycol bis (methallyl carbonate) to produce a flexible, colorless gel which was tacky on one side. The gel was provided with coatings of both sides and placed between tempered glass plates as described in Example I.

The sandwich was heated for 75 minutes at 80° C. and then at 100° C. for 2 hours. The sheet was then removed from the plates and heated at 100° C. for 2 hours.

*Example IV*

A quantity of partially polymerized ethylene glycol bis (allyl carbonate) was prepared by heating monomeric ester containing 5 percent, at a temperature of 70° C., by weight of benzoyl peroxide until the viscosity increased 200 percent. The thickened monomer was then poured into a 14" x 14" tray as in Example I and heated for 250 minutes at a temperature of 70° C. The gel was removed from the tray and provided with coatings of a further portion of partially polymerized ethylene glycol bis (allyl carbonate) on both sides and placed between tempered glass plates as described in Example I. The thickened monomer used for coating had been polymerized to a viscosity increase of 500 percent at a temperature of 70° C. The sandwich was heated for one hour at 75° C. and then at 100° C. for 15 minutes. The sheet was then removed from the plates and heated at 100° C. for 30 minutes.

*Example V*

The process of Example I was repeated using diethylene bis (methallyl carbonate) to produce a flexible, colorless gel which was tacky on one side. The tacky portion was scraped off with a razor blade. The gel was provided with coatings and placed between tempered glass plates as described in Example I, using for the coating agent a solution of 5 percent by weight of benzoyl peroxide in glycol bis (allyl carbonate) thickened to a viscosity increase of 500 percent by heating at 70° C.

The sandwich was heated at 75° C. for 1.5 hours and then for 1.5 hours at 90° C. The sheet was then removed from the plates and heated at 100° C. for 2 hours.

*Example VI*

A quantity of thickened diallyl phthalate was prepared as in Example I. At the same time a gel was prepared from diethylene glycol bis (methallyl carbonate) as in Example III and the gel thus prepared was coated with the thickened diallyl phthalate as in Example I. The coated sheet was placed between glass plates and heated at 75° C. for 2 hours and thereafter, the temperature was raised to 100° C. for one-half hour. The plates were then pried apart and the sample heated for 2 hours between glass plates at 100° C. whereby a glass sheet having a comparatively flexible interior and a hard, tough surface was obtained.

While the present invention is particularly applicable to the production of polymers of organic esters which contain at least two polymerizable groups, it may also be applied to the polymerization of other materials. Thus, various polymerizable materials including methyl, ethyl, propyl, or butyl acrylate, methacrylate, chloracrylate, or other alpha, alkyl or halo substituted acrylate, vinyl acetate, styrene, etc., may be polymerized to form an incompletely polymerized solid polymer. This polymer may then be coated and the coating and the base may be polymerized. By this means, it is generally possible to secure an adhesion superior to that which may be obtained in coating the completely polymerized polymer.

Although the present invention has been described with particular reference to the specific details of certain embodiments thereof, it is not intended that such details shall be regarded limitations upon the scope of the invention, except insofar as included in the accompanying claims.

I claim:

1. A method which comprises polymerizing an organic oxygen compound which contains at least two polymerizable groups to form a polymerizable gel, coating the surfaces of the gel with a polymerizable organic oxygen compound containing at least two polymerizable unsaturated groups and polymerizing the gel and the coating while the coating is maintained in contact with a smooth surfaced mold.

2. A method which comprises polymerizing an organic oxygen compound which contains at least two polymerizable groups to form a polymerizable gel, coating the surfaces of the gel with a partially polymerized syrup derived by polymerization of an organic oxygen compound containing at least two polymerizable groups, applying a smooth surfaced mold to the coating and polymerizing the gel and the coating.

3. A method which comprises polymerizing an unsaturated alcohol polyester of a polybasic acid to form a gel, freeing the gel from the mold, coating the gel with an unsaturated alcohol polyester of a polybasic acid, and polymerizing the coating and the gel while the coating is maintained in contact with a smooth surfaced mold.

4. A method which comprises polymerizing an unsaturated alcohol polyester of a polybasic acid to form a gel, freeing the gel from the mold, coating the gel with a partially polymerized syrup derived by polymerization of an unsaturated alcohol polyester of a polybasic acid and polymerizing the coating and the gel.

5. The process of claim 3 wherein the ester used to form the gel is an allyl ester.

6. The process of claim 3 wherein the ester used to form the gel is a methallyl ester.

7. The process of claim 3 wherein the ester used as the coating is an allyl ester.

8. The process of claim 3 wherein the ester used as the coating is a methallyl ester.

9. The process of claim 3 wherein the ester used as the coating is a vinyl ester.

10. The process of claim 3 wherein the ester used to form the gel is an ester of carbonic acid.

11. The process of claim 3 wherein the ester used to form the gel is diethylene glycol bis (methallyl carbonate).

12. A method which comprises polymerizing a polymerizable compound containing at least two polymerizable unsaturated groups to form a gel, freeing the gel from the mold, coating a surface of the gel with a polymerizable compound containing at least two polymerizable unsaturated groups, polymerizing the coating while maintaining the coating in contact with a smooth-surfaced mold, freeing the coating from the surface of the mold after the coating has been polymerized to a gel, cooling the polymer, applying a smooth-surfaced mold and continuing polymerization.

13. A method of preparing a hard, glassy, mold polished sheet of polymer of a compound containing at least two unsaturated hydrocarbon radicals that in polymerizing to final state in contact with confining surface, tend to shrink and crack, which process comprises polymerizing the monomeric compound on a smooth surface with one side exposed to the air until the resin surface in contact with the smooth surface becomes hard and non-tacky while the exposed surface remains relatively soft, freeing the resin sheet from the smooth surface, coating the soft side with the same monomeric compound and polymerizing the soft side in contact with a smooth surface until a hard non-tacky surface is secured.

14. A method of preparing a sheet of polymer of a compound containing at least two unsaturated hydrocarbon radicals which comprises polymerizing the monomeric compound in the presence of organic oxygen yielding compound with one side in contact with a smooth surface, continuing the polymerization until said one side, contacting the smooth surface, is solid and non-tacky, freeing the resin from the smooth surface, coating the other side with a monomeric compound containing at least two unsaturated hydrocarbon radicals and polymerizing said other side in contact with a smooth surface until a solid and non-tacky surface is obtained.

15. A method of preparing a sheet of polymer of a compound containing two polymerizable unsaturated hydrocarbon radicals separated by an oxygen linkage which comprises polymerizing the compound in the presence of an organic peroxide and in contact with a smooth mold surface until a sheet of gel is formed having a lower surface hard and smooth and an upper surface soft and tacky, freeing the gel sheet from the smooth surface, coating a hard smooth mold surface with a liquid compound having in its monomeric form two polymerizable unsaturated radicals, applying the said gel sheet with the soft tacky surface in contact with the coated mold surface in such manner to prevent the entrapment of air bubbles, and continuing the polymerization until a durable polymer sheet is formed.

VINCENT MEUNIER.